United States Patent
Ishii et al.

(10) Patent No.: US 11,762,664 B2
(45) Date of Patent: Sep. 19, 2023

(54) DETERMINING A RESTART POINT IN OUT-OF-ORDER EXECUTION

(71) Applicant: Arm Limited, Cambridge (GB)

(72) Inventors: Yasuo Ishii, Austin, TX (US); Michael David Achenbach, Austin, TX (US); David Gum Lim, Austin, TX (US); Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 80 days.

(21) Appl. No.: 17/569,157

(22) Filed: Jan. 5, 2022

(65) Prior Publication Data

US 2023/0214223 A1    Jul. 6, 2023

(51) Int. Cl.
*G06F 9/38* (2018.01)
*G06F 9/30* (2018.01)

(52) U.S. Cl.
CPC .......... *G06F 9/3861* (2013.01); *G06F 9/3016* (2013.01); *G06F 9/30145* (2013.01); *G06F 9/3834* (2013.01); *G06F 9/3838* (2013.01)

(58) Field of Classification Search
None
See application file for complete search history.

(56) References Cited

U.S. PATENT DOCUMENTS

| | | | | |
|---|---|---|---|---|
| 5,146,569 | A * | 9/1992 | Yamaguchi | G06F 11/141 712/228 |
| 5,421,022 | A * | 5/1995 | McKeen | G06F 9/3865 712/E9.05 |
| 7,469,334 | B1 * | 12/2008 | Chaudhry | G06F 9/3863 712/228 |
| 9,262,171 | B2 * | 2/2016 | Golla | G06F 9/3838 |
| 11,074,077 | B1 * | 7/2021 | Al Sheikh | G06F 9/3808 |
| 2012/0278592 | A1 * | 11/2012 | Tran | G06F 9/30116 712/E9.028 |
| 2018/0300148 | A1 * | 10/2018 | Schuttenberg | G06F 9/3842 |

OTHER PUBLICATIONS

Fisher, Faraboschi, and Young, "Embedded Computing: A VLIW Approach to Architecture, Compilers, and Tools", Elsevier, pp. 219-220 (Year: 2005).*

* cited by examiner

*Primary Examiner* — Andrew Caldwell
*Assistant Examiner* — Kasim Alli
(74) *Attorney, Agent, or Firm* — NIXON & VANDERHYE P.C.

(57) ABSTRACT

There is provided a data processing apparatus comprising decode circuitry responsive to receipt of a block of instructions to generate control signals indicative of each of the block of instructions, and to analyse the block of instructions to detect a potential hazard instruction. The data processing apparatus is provided with decode circuitry to encode information indicative of a clean restart point into the control signals associated with the potential hazard instruction. The data processing apparatus is provided with data processing circuity to perform out-of-order execution of at least some of the block of instructions, and control circuitry responsive to a determination, at execution of the potential hazard instruction, that data values used as operands for the potential hazard instruction have been modified by out-of-order execution of a subsequent instruction, to restart execution from the clean restart point and to flush held data values from the data processing circuitry.

19 Claims, 11 Drawing Sheets

DETERMINING A RESTART POINT IN OUT-OF-ORDER EXECUTION

TECHNICAL FIELD

The present invention relates to data processing. More particularly the present invention relates to a data processing apparatus, a method of operating a data processing apparatus and a non-transitory computer-readable medium to store computer-readable code for fabrication of a data processing apparatus.

BACKGROUND

Some data processing apparatuses are provided with processing circuitry for out-of-order execution of some instructions from a block of instructions. By performing instructions out-of-order some instructions have the potential to cause a data hazard, for example, if operands required by an instruction have been modified out-of-order.

SUMMARY

In some configurations described herein there is a data processing apparatus comprising:

decode circuitry responsive to receipt of a block of instructions having a program counter order to generate control signals indicative of each of the block of instructions, and to analyse the block of instructions to detect a potential hazard instruction, wherein the decode circuitry is configured to encode information indicative of a clean restart point into the control signals associated with the potential hazard instruction;

data processing circuity to perform data processing operations in response to the control signals, wherein the data processing circuitry is configured to perform out-of-order execution of at least some of the block of instructions; and control circuitry responsive to a determination, at a point of execution of the potential hazard instruction, that data values to be used as operands associated with the potential hazard instruction have been modified by out-of-order execution of a subsequent instruction that occurs sequentially after the potential hazard instruction in the program counter order, to restart execution from the clean restart point and to flush held data values associated with instructions subsequent to the clean restart point from the data processing circuitry.

In some configurations described herein there is a method of operating a data processing apparatus comprising receiving a block of instructions having a program counter order, generating control signals indicative of each of the block of instructions, analysing the block of instructions to detect a potential hazard instruction, and encoding information indicative of a clean restart point into the control signals associated with the potential hazard instruction;

performing, with data processing circuitry, data processing operations in response to the control signals, wherein performing the data processing operations includes performing out-of-order execution of at least some of the block of instructions; and responsive to a determination, at a point of execution of the potential hazard instruction, that data values to be used as operands associated with the potential hazard instruction have been modified by out-of-order execution of a subsequent instruction that occurs sequentially after the potential hazard instruction, restarting execution from the clean restart point and flushing held data values associated with instructions subsequent to the clean restart point from the data processing circuitry.

In some configurations described herein there is a non-transitory computer-readable medium to store computer-readable code for fabrication of a data processing apparatus comprising:

decode circuitry responsive to receipt of a block of instructions having a program counter order to generate control signals indicative of each of the block of instructions, and to analyse the block of instructions to detect a potential hazard instruction, wherein the decode circuitry is configured to encode information indicative of a clean restart point into the control signals associated with the potential hazard instruction;

data processing circuity to perform data processing operations in response to the control signals, wherein the data processing circuitry is configured to perform out-of-order execution of at least some of the block of instructions; and control circuitry responsive to a determination, at a point of execution of the potential hazard instruction, that data values to he used as operands associated with the potential hazard instruction have been modified by out-of-order execution of a subsequent instruction that occurs sequentially after the potential hazard instruction, to restart execution from the clean restart point and to flush held data values associated with instructions subsequent to the clean restart point from the data processing circuitry.

BRIEF DESCRIPTION OF THE DRAWINGS

The present invention will he described further, by way of example only, with reference to embodiments thereof as illustrated in the accompanying drawings, in which.

DESCRIPTION OF EXAMPLE EMBODIMENTS

Figure 1:
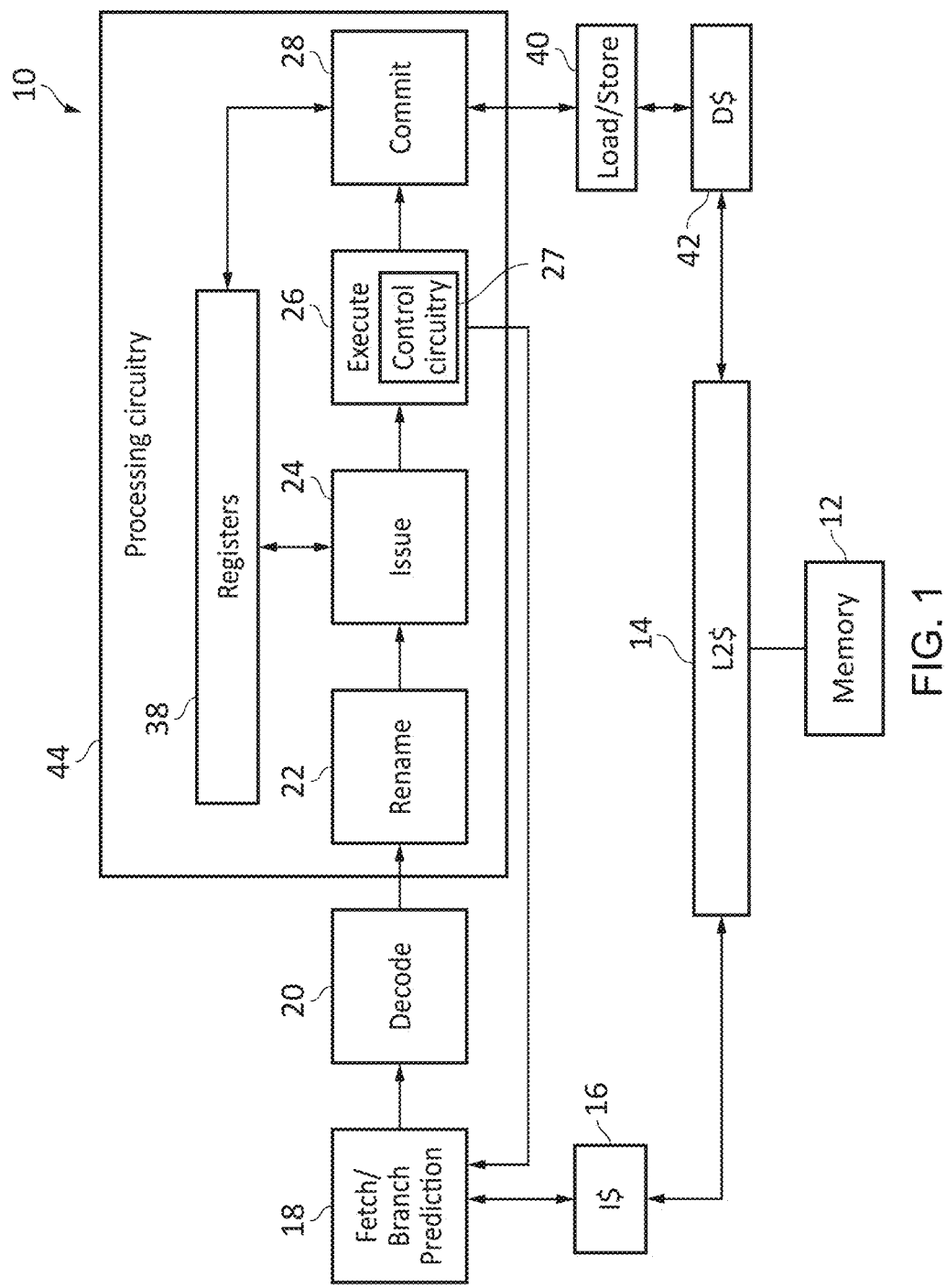
FIG. 1 schematically illustrates a data processing apparatus according, to various configurations of the present disclosure.

Before discussing the embodiments with reference to the accompanying figures, the following description of embodiments is provided.

In accordance with one example configuration there is provided a data processing apparatus comprising: decode circuitry responsive to receipt of a block of instructions having a program counter order to generate control signals indicative of each instruction of the block of instructions. The decode circuitry is configured to analyse the block of instructions to detect a potential hazard instruction and to encode information indicative of a clean restart point into the control signals associated with the potential hazard instruction. The data processing apparatus is also provided with data processing circuity to perform data processing operations in response to the control signals. The data processing circuitry is configured to perform out-of-order execution of at least some of the block of instructions. The data processing apparatus is also provided with control circuitry responsive to a determination, at a point of execution of the potential hazard instruction, that data values to be used as operands associated with the potential hazard instruction have been modified by out-of-order execution of a subsequent instruction that occurs sequentially after the potential hazard instruction in the program counter order, to restart execution from the clean restart point and to flush held data values associated with instructions subsequent to the clean restart point from the data processing circuitry.

Some data processing apparatuses are provided with out-of-order processing circuitry that is capable of processing instructions in an order that is different to a program counter order in which the instructions are specified to be executed by the programmer. Out-of-order processing can result in increased throughput because instructions can be executed ahead of time, for example, without having to wait for high latency instructions that precede the instructions in program counter order to first complete. However, tracking instruction execution and potential data hazards can result in added complication and increased circuit area. In addition, care must be taken when dealing with data hazards. One particular data hazard is a Read After Write (RAW) hazard in which a data value is used (read) as an operand associated with a potential hazard instruction that has been modified (written to) by an instruction that occurs, in program order, sequentially after the data value is used. Whilst circuitry can be added to mitigate the occurrence of such hazards, in some data processing apparatuses it is beneficial to allow the subsequent instruction to speculatively execute and to initiate a data flush to remove all data that is held by the data proceeding circuitry, and that is associated with the speculatively executed instructions, from the data processing circuitry at a point when the potential hazard instruction is executed.

The inventors have realised that, in such a situation, flushing all speculatively executed instructions from the data processing apparatus can result in data that is held (for example as temporary non-committed data values) in association with validly executed instructions, i.e., instructions that occur between the potential hazard instruction and the subsequently executed instruction in program counter order and which are not affected by the data hazard, being flushed from the data processing apparatus and having to be repeated. This repetition results in increased latency and increased power consumption. In order to overcome this problem, there is provided decode circuitry that identifies potential hazard instructions in a block of instructions. The role of the decode circuitry is to translate instructions from the block of instructions to generate control signals that control the data processing circuitry to perform operations. The decode circuitry recognises and translates a specific set of instructions that form an instruction set architecture and provide a complete library of instructions that a programmer can use to control the data processing circuitry. In addition, the decode circuitry is arranged, in response to the identification of the potential hazard instruction as one of the instructions of the block of instructions, to encode additional information into the control signals that are associated with the potential hazard instruction. The additional information is indicative of a clean restart point and is determined, by the decode circuitry, based on an analysis of instructions that occur subsequent to the potential hazard instruction in program counter order. The clean restart point identifies a point at which it is safe to restart execution subsequent to an occurrence of a hazard condition.

The data processing apparatus is also provided with control circuitry that identifies the occurrence of a RAW hazard associated with the potential hazard instruction. Specifically, the control circuitry identifies whether an operand that needs to be read for execution of the potential hazard instruction has been modified (written to) by a subsequent instruction that has been executed out-of-order. If such an instruction is identified, then the control circuitry causes a partial flush of the processing circuitry. In particular, rather than flushing all data values associated with speculatively executed instruction and restarting execution from the potential hazard instruction, the control circuitry causes data values associated with instructions subsequent (in program counter order) to the clean restart point to be flushed from the data processing circuitry and restarts execution from the clean restart point which is identified using the information that has been encoded into the control signals that are associated with the potential hazard instruction. In this way the data processing apparatus is able to reduce latency and power consumption associated with restarting execution subsequent to the identification of a RAW hazard on execution of the potential hazard instruction.

In some configurations the clean restart point identities a restart instruction that occurs after the potential hazard instruction in the program counter order. The clean restart point therefore identifies an instruction that is a sequentially first instruction (in program counter order) that needs to he re-executed subsequent to the detection of the data hazard. In other words, the clean restart point identifies a number of instructions, subsequent to the potential hazard instruction, that do not need to be flushed and re-executed in the event of a hazard. In particular, instructions that occur between the potential hazard instruction and the restart instruction do not need to he re-executed by the data processing circuitry and, hence, data values that are held in association with these instructions are retained in the data processing circuitry.

The restart instruction can be any instruction that occurs subsequent to the potential hazard instruction. For example, the decode circuitry could analyse instructions over a number of blocks of instructions to identify the most appropriate instruction to be used as the restart instruction. However, in some configurations the restart instruction is one of the block of instructions. Hence, decode circuitry can be provided that operates on a single block of instructions resulting in a compact implementation.

In some configurations the restart instruction is separated from the potential hazard instruction by at least one other instruction in the program counter order. In such configurations there is always one instruction, the at least one other instruction, that does not need to be re-executed subsequent to the control circuitry identifying the RAW hazard.

The restart instruction can be any instruction that occurs subsequent to the restart instruction. However, in some configurations the restart instruction occurs before the subsequent instruction in the program counter order. Hence, the subsequent instruction, which caused the RAW hazard through out-of-order execution, will be re-executed thereby correcting the data dependency which resulted in the flushing of the data processing circuitry.

The subsequent instruction may be any instruction that could trigger the data hazard. However, in some configurations the subsequent instruction is a sequentially first load instruction to occur after the potential hazard instruction in the program counter order; and the restart instruction is a youngest instruction to occur before the sequentially first load instruction in the program counter order. In particular, due to the latency associated with a load instruction, it is often beneficial to speculatively issue the load instruction so that the data value is returned as soon as possible and to consider consequences (i.e., triggering a RAW hazard) at a later point (later stage) in execution. Hence, the definition of a clean restart point that occurs subsequent to a potential hazard instruction, but that occurs before a load instruction (that is also sequentially after the potential hazard instruction in program counter order) provides a particularly efficient implementation of the present techniques. In such configurations, the decode circuitry is arranged to identify load instructions that occur subsequent to an identified potential hazard instruction. In particular, the decode circuitry is arranged to identify a sequentially first (oldest) load instruction that is sequentially after the potential hazard instruction. The decode circuitry is responsive to such an identification to encode, as the restart instruction, a youngest instruction that precedes the sequentially first load instruction.

In some configurations the restart instruction is a sequentially first branch instruction to occur after the potential hazard instruction in the program counter order. A branch instruction results in a deviation in a path of execution which can be based on one or more conditional flags associated with the data processing apparatus. Hence, the result of the branch instruction can be dependent on a correct resolution of the RAW hazard. Therefore, the instructions that are executed subsequent to the branch instruction may vary dependent on the resolution of the RAW hazard. In such configurations, the clean restart point is therefore restricted to identify a restart instruction as the sequentially first branch instruction in program counter order that occurs after the potential hazard instruction. In this way, the branch instruction is re-executed and a correct order of execution can be obtained subsequent to the occurrence of the RAW hazard.

In some configurations the data processing apparatus further comprises branch prediction circuitry, and wherein the control circuitry is configured to postpone flushing the data processing circuitry until resolution of the sequentially first branch instruction by the branch prediction circuitry. Where branch prediction is used as a technique for speculative execution, the resolution of branch instructions can result in flushing the data processing circuitry, for example, where it turns out that a branch has been incorrectly predicted. In such configurations there are therefore multiple routes by which the data processing circuitry can be flushed. Therefore, it can be beneficial to postpone the triggering of a flush associated with the potential hazard instruction until the resolution of the sequentially first branch instruction to minimise the occurrence of data flushes.

In some configurations the branch prediction circuitry comprises a mis-prediction flushing mechanism to flush held data values associated with instructions subsequent to a mis-predicted branch instruction; and the control circuitry is configured to restart execution from the clean restart point and to flush held data values associated with instructions subsequent to the clean restart point from the data processing circuitry by triggering the finis-prediction flushing mechanism. By reusing the existing mis-prediction mechanism the data processing apparatus can trigger a flush without the requirement for additional circuitry to trigger the data flus. As a result, a particularly compact implementation can be provided.

In some configurations the data processing circuitry is responsive to the control signals to perform one or more micro-operations for each of the block of instructions, and the restart instruction is a sequentially first instruction of the block of instructions to occur after the potential hazard instruction in the program counter order for Which a plurality of micro-operations is performed. In order to restart execution from the clean restart point, the control circuitry requires information indicative of a program counter value associated with the clean restart point and a number indicative of a number of micro-operations between the potential hazard instruction and the clean restart point. Hence, in the general case, the information indicative of the clean restart point stores two values, the first indicative of a number of program counter values and the second indicative of a number of micro-operations. By using the sequentially first instruction of the block of instruction for which a plurality of micro-operations is defined, the number of micro-operations between the potential hazard instruction and the clean restart point is the same as the number of program counter values that occur between the potential hazard instruction and the clean restart point. Hence, the total amount of information that has to be encoded into the control signals associated with the potential hazard instruction is halved resulting in a more efficient implementation.

The potential hazard instruction can be any instruction for which there is a potential for a data hazard to occur. However, in some configurations the potential hazard instruction is a store instruction. The store instruction may be an instruction that is arranged to store a data value in a location that is pointed to by a value in a register. Hence, the location to which the data is stored can he varied dependent on the content of that register. If the content of the register is modified by a subsequent instruction, then the data value will be stored to an incorrect location. The storing of a data value to an incorrect memory location results in a modification to a value that is outside of the control of the data processing circuitry. Hence, it is important to identify data hazards associated with such instructions and to resolve them. Therefore, it can be particularly beneficial to identify store instructions as potential hazard instructions, in some configurations the potential hazard instruction is identified as a potential hazard instruction based on the type of instruction. In such configurations, the instruction is identified as a potential hazard instruction based on a determination that the instruction is a store instruction.

Similarly, the subsequent instruction can be any type of instruction for which there is potential to trigger a data hazard. However, in some configurations the subsequent instruction is a load instruction. Because of the latency associated with a load instruction, it is often beneficial to speculatively issue the load instruction so that the data value is returned as soon as possible and to consider consequences (i.e., triggering a RAW hazard) at a later point in execution.

The clean restart point can be identified in a number of different ways, in some configurations the information indicative of the clean restart point comprises information identifying a number of micro-operations between the potential hazard instruction and the clean restart point. Alternatively, or in addition, in some configurations the information indicative of the clean restart point comprises information identifying a number of program counter values between the potential hazard instruction and the clean restart point.

As discussed, in some configurations the subsequent instruction is an instruction in a same block of instructions as the potential hazard instructions. However, in some configurations the subsequent instruction is an instruction of a subsequent block of instructions. Once the clean restart point has been identified and the information has been encoded into the control signals associated with the potential hazard instruction, the data processing apparatus continues with execution of the instructions. It is only on the execution of the potential hazard instruction that the control circuitry identifies that a hazard instruction has been triggered. Hence, the data processing apparatus is provided to encode the information identifying the clean restart point such that the data processing circuitry can be restarted from the clean restart point independent of a block of instructions in which the subsequent instruction occurs.

In some configurations the data processing apparatus further comprises storage circuitry to store the information indicative of the clean restart point in association with information identifying the potential hazard instruction. The storage circuitry is provided as part of, or subsequent to the decode stage of the processing circuitry. The storage circuitry stores at least information identifying the potential hazard instruction, for example, a program counter value associated with the potential hazard instruction, and information identifying the clean restart point, for example, information identifying a program counter value of the clean restart point, information identifying a number of program counter values between the potential hazard instruction and the clean restart point, and/or information identifying a number of micro-operations between the potential hazard instruction and the clean restart point.

In some configurations the storage structure is a micro-operation cache and the information identifying the potential hazard instruction is the control signals associated with the potential hazard instruction stored as one or more micro-operations. Micro-operation caches are provided to store information indicative of control signals that are obtained by decoding particular instructions. Hence, when an instruction is encountered by the decode circuitry, the micro-operation cache is first checked to determine whether the cache contains information indicative of the control signals associated with that instruction. If the micro-operation cache contains information indicative of the control signals associate with that instruction, then the decode circuitry can obtain the control signals directly from the micro-operation cache without the need to perform the steps of decoding. By encoding the information indicative of the potential hazard instruction, including information indicative of the clean restart point, into the control signals, the micro-operation cache can be used to store the information indicative of the clean restart point The information indicative of the clean restart point can be stored in the micro-operation cache in a number of ways. In some configurations the decode circuitry is configured to store the information indicative of the clean restart point by appending the information indicative of the clean restart point to at least one of the one or more micro-operations. Typically, the number of bits that are provided to store the one or more micro-operations is greater than the number of bits that are required to define the one or more micro-operations. Hence, there is sufficient space in the micro-operation encoding to store the information indicative of the clean restart point. By storing the micro-operations in this way, there is no requirement to modify the encoding of the micro-operations and the additional space can be utilised without increasing the number of bits provided for encoding the micro-operations.

Concepts described herein may be embodied in computer-readable code for fabrication of an apparatus that embodies the described concepts. For example, the computer-readable code can be used at one or more stages of a semiconductor design and fabrication process, including an electronic design automation (FDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SvstemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSIL The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention.

Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular embodiments will now be described with reference to the figures.

FIG. 1 schematically illustrates a data processing apparatus 10 according to some configurations of the present techniques. The data processing apparatus 10 is provided with a memory 12 in which program instructions are stored and from which program instructions are retrieved via a level 2 (L2) cache 14 and instruction cache 16 by fetch/branch prediction circuitry 18. Instructions that have been fetched by the fetch/branch prediction circuitry 18 are passed to the decode circuitry 20 which decodes the instructions to generate control signals. The control signals generated by the decode circuitry 20 are passed to processing circuitry 44 to perform processing operations. The processing circuitry 44 comprises rename circuitry 22, issue circuitry 24, execute circuitry 26, commit circuity 28 and registers 38. The rename circuitry 22 receives the control signals generated by the decode circuitry 20 which are then, subsequently, passed to issue circuitry 24 and on to the execute circuitry 26. The fetch/branch prediction circuitry 18 is further configured to predict the outcome of branch instructions for which the dependencies are yet to be resolved. This prediction may be based on static, random or dynamic branch prediction, or any other method known to those of ordinary skill in the art. The execute stage 26 executes the instructions and passes the results onto the commit stage 28 which holds data associated with instructions that have been speculatively executed until the data dependences associated with those instructions are resolved. The commit stage is coupled to a set of registers 38 that comprise a set of physical registers in which data values can be stored. The registers 38 are also coupled to the issue circuitry 24. The commit stage is further coupled to a load/store stage 40, which enables the commit stage to write results via data cache 42 and L2 cache 14 to memory 12.

The decode circuitry 20 is also configured to identify instructions of a block of instructions that are potential hazard instructions and to encode information indicative of a clean restart point into the control signals associated with the potential hazard instruction. The processing circuitry 44 is provided with control circuitry 27 which is illustrated as being part of the execute circuitry 26. The control circuitry 27 is configured to determine whether data values to be used as operands associated with a potential hazard instruction have been modified by out-or-order execution of a subsequent instruction that occurs sequentially after the potential hazard instruction in program counter order. In response to such an identification, the control circuitry is configured to indicate the identified hazard to the fetch/branch prediction unit 18 and is arranged to restart execution from the clean restart point and to flush held data values associated with instructions subsequent to the clean restart point from the data processing circuitry 44. These data values include data values stored in registers 38 and information associated with instructions subsequent to the clean restart point that is stored in the common unit 28.

In alternative configurations, the control circuitry 27 could be part of any one of the structures of the processing circuitry 44 or could be provided as an independent block of circuitry within the processing circuitry 44. Furthermore, in alternative configurations, the control circuitry 27 could be configured to interact with any of the functional units of the processing circuitry 44 and/or the decode circuitry 20 in order to trigger the flushing of held data values associated with instructions subsequent to the clean restart point and in order to restart execution from the clean restart point.

Figure 2:
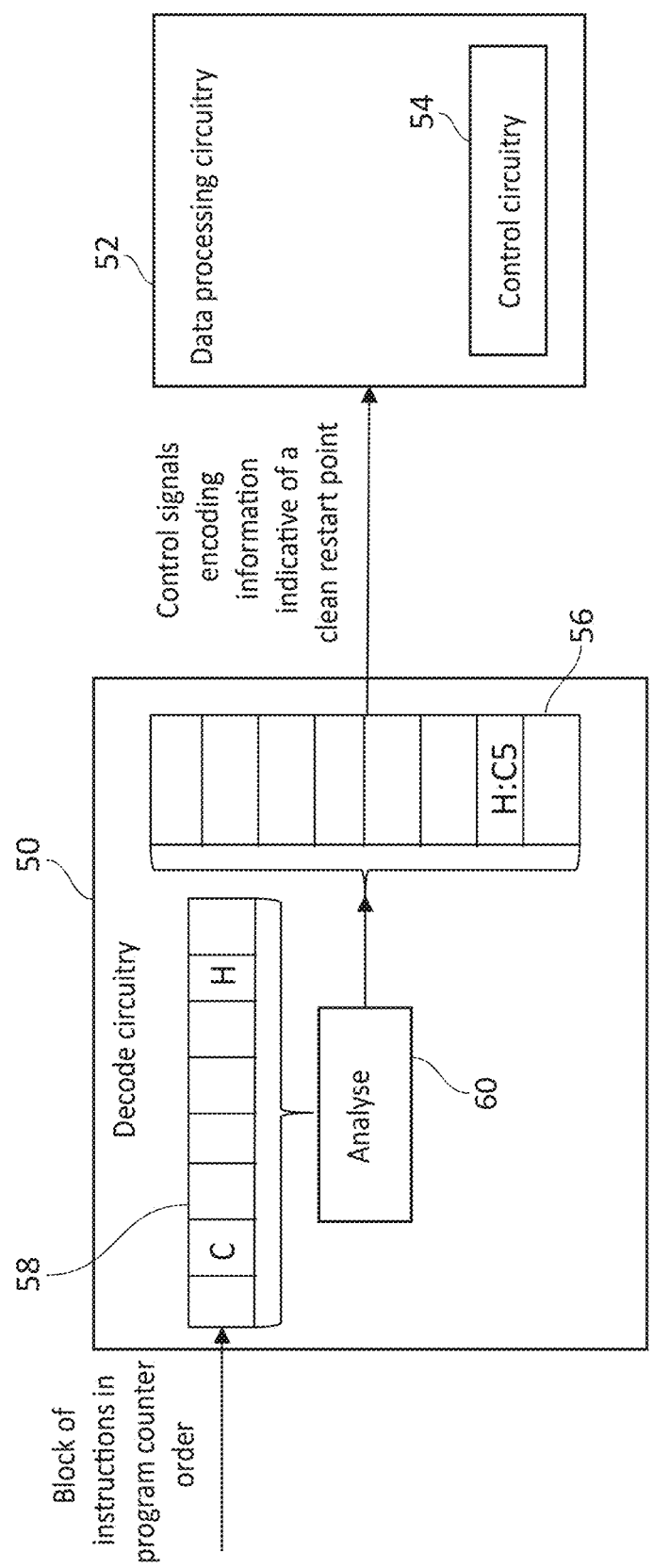
FIG. 2 schematically illustrates details of decode circuitry according to various configurations of the present disclosure.

FIG. 2 schematically illustrates details of decode circuitry 50 according to various configurations of the present disclosure. The decode circuitry 50 is arranged to receive a block of instructions 58. The blocks of instructions comprise instructions in program counter order. The block of instructions may contain one or more hazard instructions, for example, the block of instructions 58 comprises potential hazard instruction H as the second instruction. The decode circuitry 50 is configured to analyse the block of instructions 58 in order to determine whether there are potential hazard instructions and, in response to identifying the hazard instruction to identify a clean restart point. In the illustrated example the analysis circuitry 60 of the decode circuitry 50 identifies that there is a clean restart point C as the $7^{th}$ instruction. The decode circuitry 50 is arranged to generate control signals 56 from the instructions 58. The decode circuitry 50 is also configured to incorporate information indicative of the clean restart point into the control signals 56. In the illustrated example, the decode circuitry 50 has included information into the control signals associated with the hazard signal H to indicate that the clean restart point C occurs five instructions subsequent in program counter order to the potential hazard instruction. This information is illustrated as H:C5 which indicates that the control signals that are generated are associated with the potential hazard instruction H and indicate that the clean restart point is five instructions later. The control signals 56 encode (incorporate) the information indicative of the clean restart point are passed to the data processing circuitry 52. The data processing circuitry 52 performs out-of-order execution of the instructions 58 based on the control signals 56. The processing circuitry 52 is provided with control circuitry 54 to monitor for a hazard condition and the control circuitry is configured, when a hazard occurs that is associated with a potential hazard instruction, to flush held data values that are associated with instructions subsequent to the clean restart point from the data processing circuitry 52 and to restart execution from the clean restart point.

Figure 3:
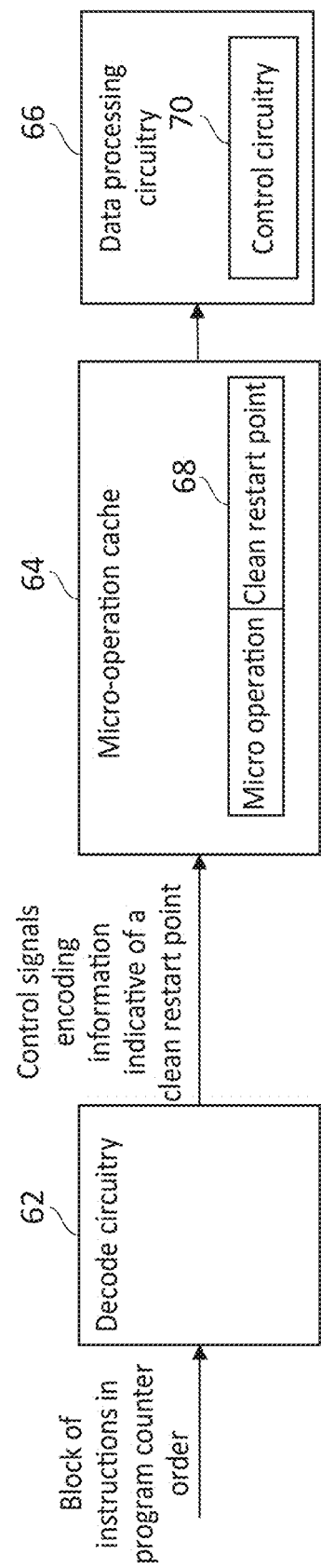
FIG. 3 schematically illustrates a data processing apparatus according to various configurations of the present disclosure.

FIG. 3 schematically illustrates further details of the processing apparatus according to various configurations of the present invention. In the illustrated configuration there is provided decode circuitry 62, a micro-operation cache 64, and data processing circuitry 66. The decode circuitry functions as described in relation to FIG. 2 and will not be described again for conciseness. The decode circuitry 62 outputs control signals encode information indicative of a clean restart point. These instructions are passed, via the micro-operation cache 64 to the data processing circuitry 66. The micro-operation cache 64 stores information 68 that indicates a clean restart point by appending by appending the information indicative of the clean restart point to at least one of the one or more micro-operations. The control signals are provided to the data processing circuitry 66 which operates in the manner described in relation to FIGS. 1 and 2.

Figure 4A:
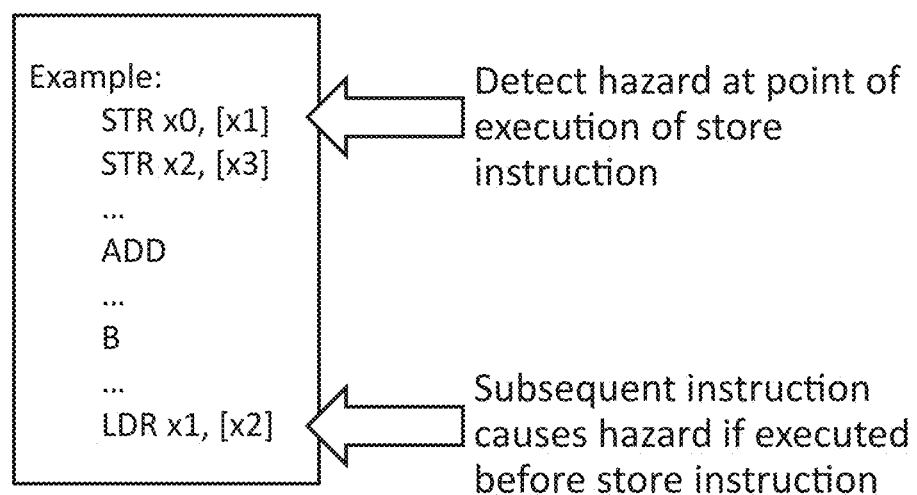
FIG. 4*a* schematically illustrates an example of a potential hazard instruction according to various configurations of the present disclosure.

FIG. 4a schematically illustrates an example of a potential hazard instruction according to various configurations of the present disclosure. In the illustrated example, a sequence of instructions is provided including a first store instruction "STR x0, [x1]" which causes the contents of register x0 to be stored in a location that is identified by the contents of register x1. Subsequent to the store instruction are a number of other instructions including a second store instruction, an addition instruction and a branch instruction. Finally, there is a load instruction "LDR x1, [x21]" which causes a data value to be loaded from a location identified in the register x2 into register x1. The instructions are presented in program counter order. Hence, the first store instruction causes the contents of x0 to be stored in a location that is identified by the original contents of x1. Subsequently, in program counter order, the load instruction is carried out after a number of intervening instructions. The result of the store instruction is that new data is stored in the register x1. When the instructions are executed in the program counter order, the load instruction has no effect on the first store instruction.

Figure 4B:
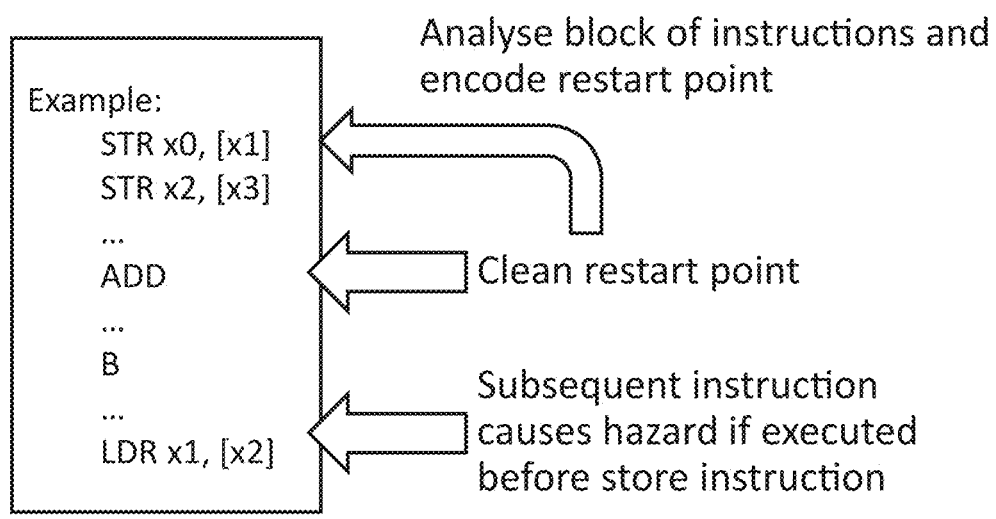
FIG. 4*b* schematically illustrates an example of a potential hazard instruction according to various configurations of the present disclosure.

In a data processing apparatus that supports out-of-order execution of instructions, the load instruction could potentially be issued for execution prior to the first store instruction. In this case, the store instruction will not operate correctly because the load instruction has already altered the contents of x1 and, hence, the value of x0 could potentially be stored to an incorrect location. This hazard would be detected on execution of the first store instruction and would result in the data processing circuitry being flushed and restarted. The data processing apparatus according to the present techniques is provided with decode circuitry that is configured to identify potential hazard instructions prior to the determination at the point of execution of the store instruction. The analysis of the block of instructions is illustrated in FIG. 4b. In particular, the instructions are analysed by the decode circuitry and the first store instruction is identified as a potential hazard instruction. The decode circuitry is further configured to identify a clean restart point based on the instructions of the block of instructions. In the illustrated example, the decode circuitry identifies the ADD instruction as a clean restart point and encodes information indicative of the ADD instruction as a clean restart point in the control signals that are associated with the first store instruction. Subsequently, on execution of the instructions of the block of instructions, if the load instruction is executed prior to the first store instruction, then on execution of the first store instruction a hazard is identified as illustrated in FIG. 4a. In response to the identification of the hazard, the control circuitry is configured to determine the clean restart point based on the control signals that are associated with the potential hazard instruction. The control circuitry is configured to, in response to the identification, cause held data values to be flushed from the data processing apparatus and to restart execution from the clean restart point. In this way, the data processing apparatus is able to avoid re-executing instructions that are between the potential hazard instruction and the clean restart point in program counter order.

Figure 4C:
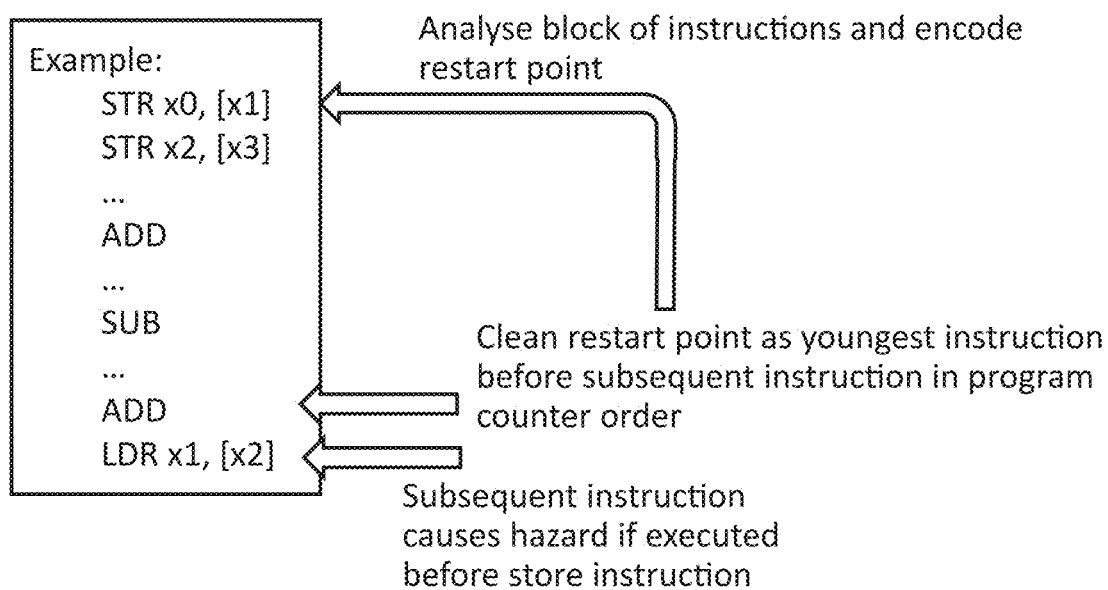
FIG. 4*c* schematically illustrates an example of a potential hazard instruction according to various configurations of the present disclosure.

FIG. 4c schematically illustrates an alternative example in which the clean restart point is identified as a youngest instruction that occurs before the subsequent instruction in program counter order. In the illustrated example the data hazard results from the load instruction, that is subsequent to the first store instruction in program counter order, being executed before the first store instruction. Hence, in this example, the potential hazard instruction is a store instruction and the subsequent instruction is the load instruction. In order to minimise the processing that is required in response to a flush of the data processing circuitry, the clean restart point is identified as the ADD instruction that immediately precedes the load instruction. Hence, none of the instructions between the first store instruction and the load instruction are required to be re-executed in the event that a data hazard is detected on execution of the first store instruction.

Figure 5A:
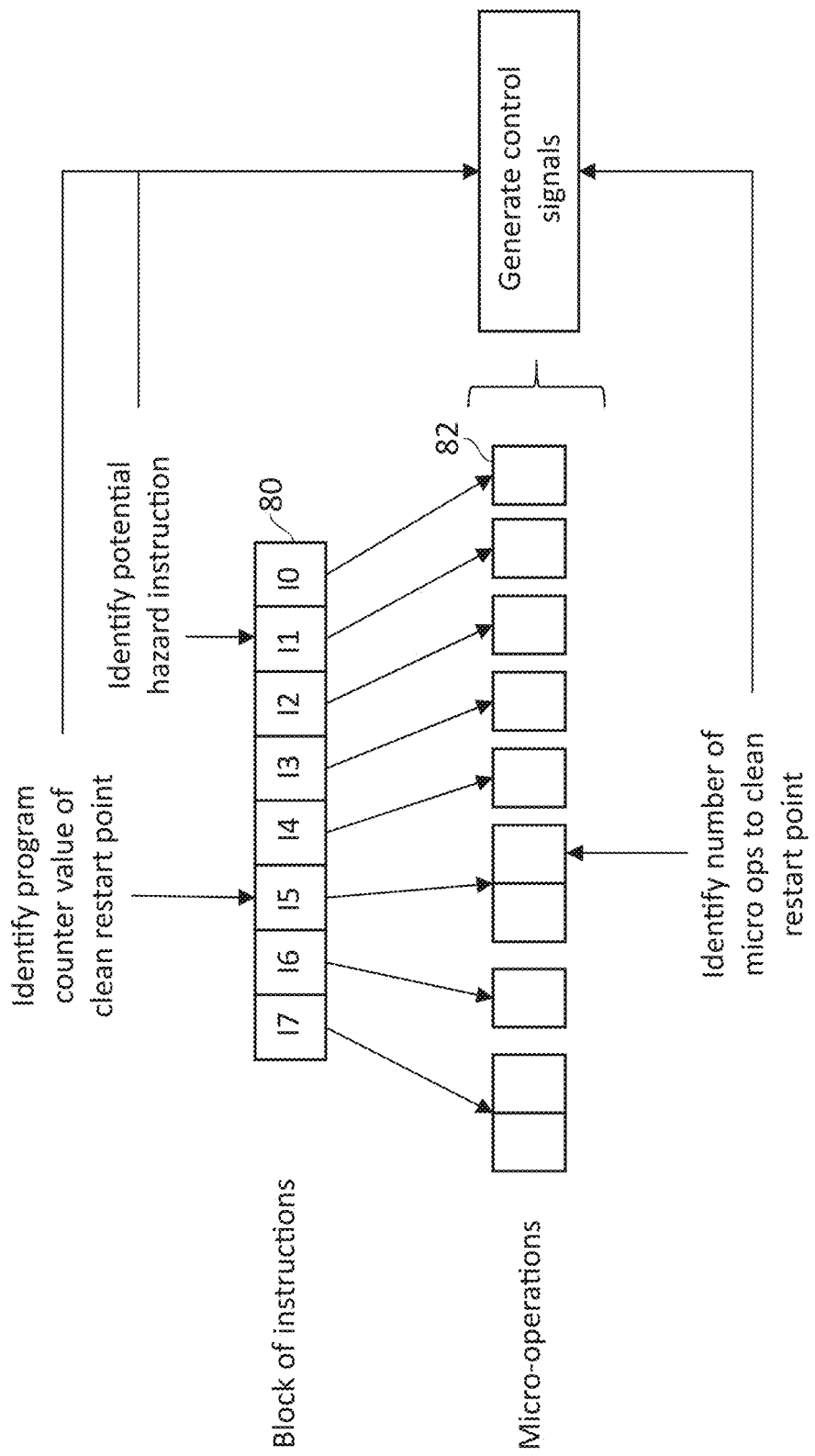
FIG. 5*a* schematically illustrates an example of an identification of a clean restart point according to various configurations of the present disclosure.

FIG. 5a schematically illustrates an example of an identification, by the decode circuitry, of a clean restart point according to various configurations of the present disclosure. The decode circuitry receives a block of instructions 80 comprising a number of instructions I0 to I7. The decode circuitry is configured to identify potential hazard instructions. In the illustrated example, the decode instruction identifies instruction I1 as a potential hazard instruction, for example, based on a type of the instruction. The decode circuitry splits each of the instructions 80 into one or more micro-operations 82 that are to be performed by the data processing circuitry in response to the instructions. In the illustrated example, instructions I0 to I4 and I6 each correspond to a single micro-operation and instructions I5 and I7 each correspond to two micro-operations, The decode circuitry is arranged to determine a clean restart point based on a first instruction of the block of instructions 80 for which a plurality of micro-operations are generated. In the illustrated configuration this corresponds to instruction I5. Information indicative of the number of micro-operations between the potential hazard instruction and the clean restart point (which, because the clean restart point is the first instruction subsequent to the potential hazard instruction that corresponds to a plurality of micro-operations, is equal to the number of program counter values between the potential hazard instruction and the clean restart point) and information indicative of the potential hazard instruction are encoded into the information indicative of the micro-operations 82 that are generated based on the block of instructions 80.

Figure 5B:
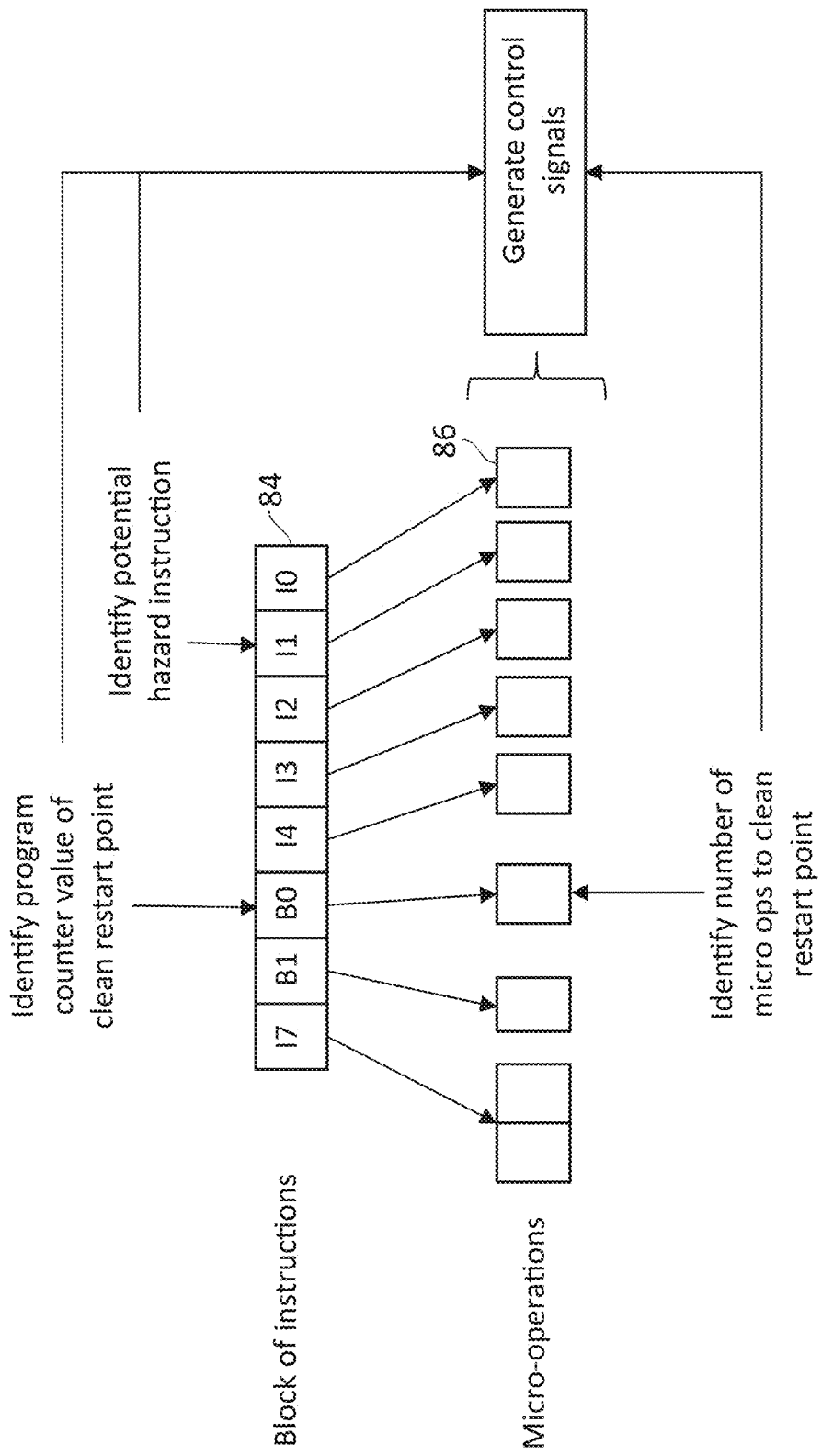
FIG. 5*b* schematically illustrates an example of an identification of a clean restart point according to various configurations of the present disclosure.

FIG. 5b schematically illustrates a further example of an identification of a clean restart point according to various configurations of the present disclosure. The decode circuitry receives a block of instructions 84 comprising a number of instructions I0 to I4, branch instructions B0 and B1, and I7. The decode circuitry is configured to identify potential hazard instructions. In the illustrated example, the decode instruction identifies instruction I1 as a potential hazard instruction, for example, based on a type of the instruction. The decode circuitry splits the instructions 84 into a number of micro-operations 86 that are to be performed by the data processing circuitry in response to the instructions. In the illustrated example, instructions I0 to I4 and B0 to B1 each correspond to a single micro-operation and instruction I7 corresponds to two micro-operations. The decode circuitry is arranged to determine a clean restart point based on a sequentially first branch instruction of the block of instructions 84. In the illustrated configuration this corresponds to instruction B0. Information indicative of the number of program counter values (and, optionally, the number of micro-operations) between the potential hazard instruction and the clean restart point and information indicative of the potential hazard instruction are encoded into the information indicative of the micro-operations 86 that are generated based on the block of instructions 84. In the illustrated example the number of program counter values and the number of micro-operations between the potential hazard instruction and the clean restart point are equal. In alternative examples this may not be the case, in which case the information indicative of the number of micro-operations is required in addition to the information indicative of the number of program counter values in order to restart execution from the clean restart point.

Figure 6:
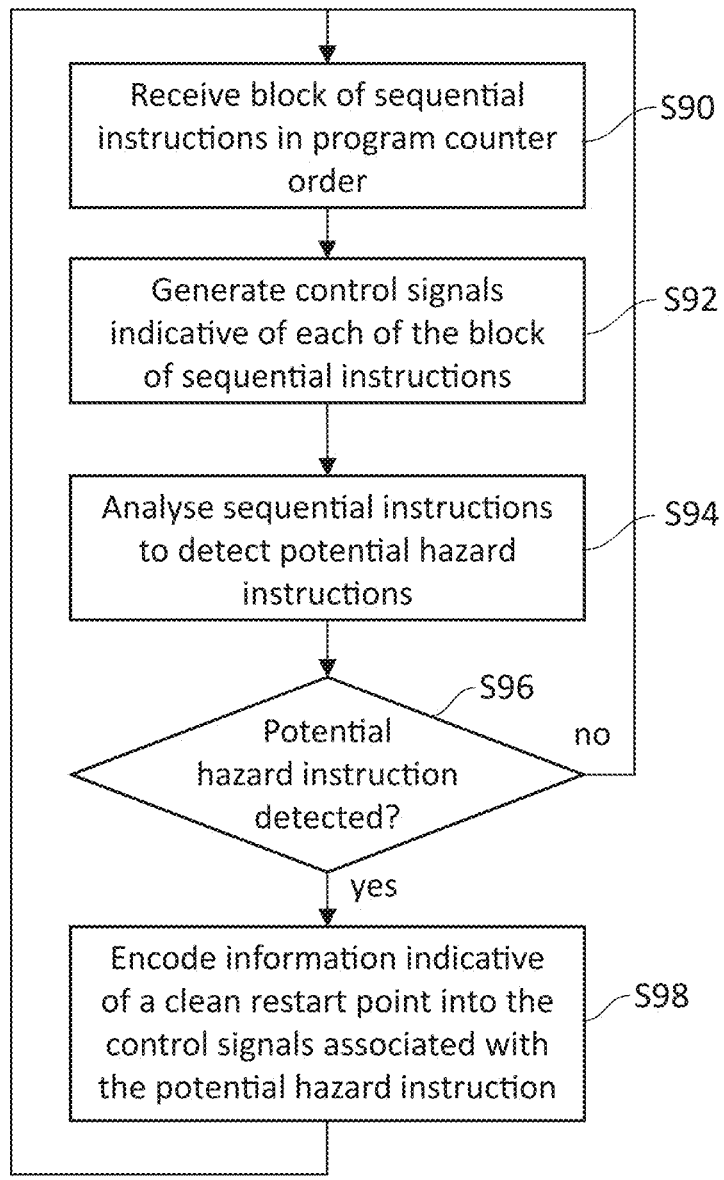
FIG. 6 schematically illustrates a sequence of steps carried out by decode circuitry according to various configurations of the present disclosure.

FIG. 6 schematically illustrates a sequence of steps carried out by decode circuitry according to various configurations of the present disclosure. Flow begins at step S90 where the decode circuitry receives a block of sequential instructions that are in program counter order. Flow then proceeds to step S92 where the decode circuitry generates control signals indicative of each instruction of the block of sequential instructions. Flow then proceeds to step S94 where the block of sequential instructions is analysed to detect whether there are any potential hazard instructions. Flow then proceeds to step S96 where it is determined whether any potential hazard instructions were detected. If no then flow returns to step S90. If however, at step S96, it was determined that a potential hazard instruction was detected then flow proceeds to step S98 where information indicative of a clean restart point is encoded into the control signals associated with the potential hazard instruction. Flow then returns to step S90. Whilst the steps that are carried out by the control circuitry have been illustrated sequentially, steps S92, S94, and S96 can be carried out in parallel. Further alternative orderings of the steps of FIG. 6 would be readily apparent to the person having ordinary skill in the art.

Figure 7:
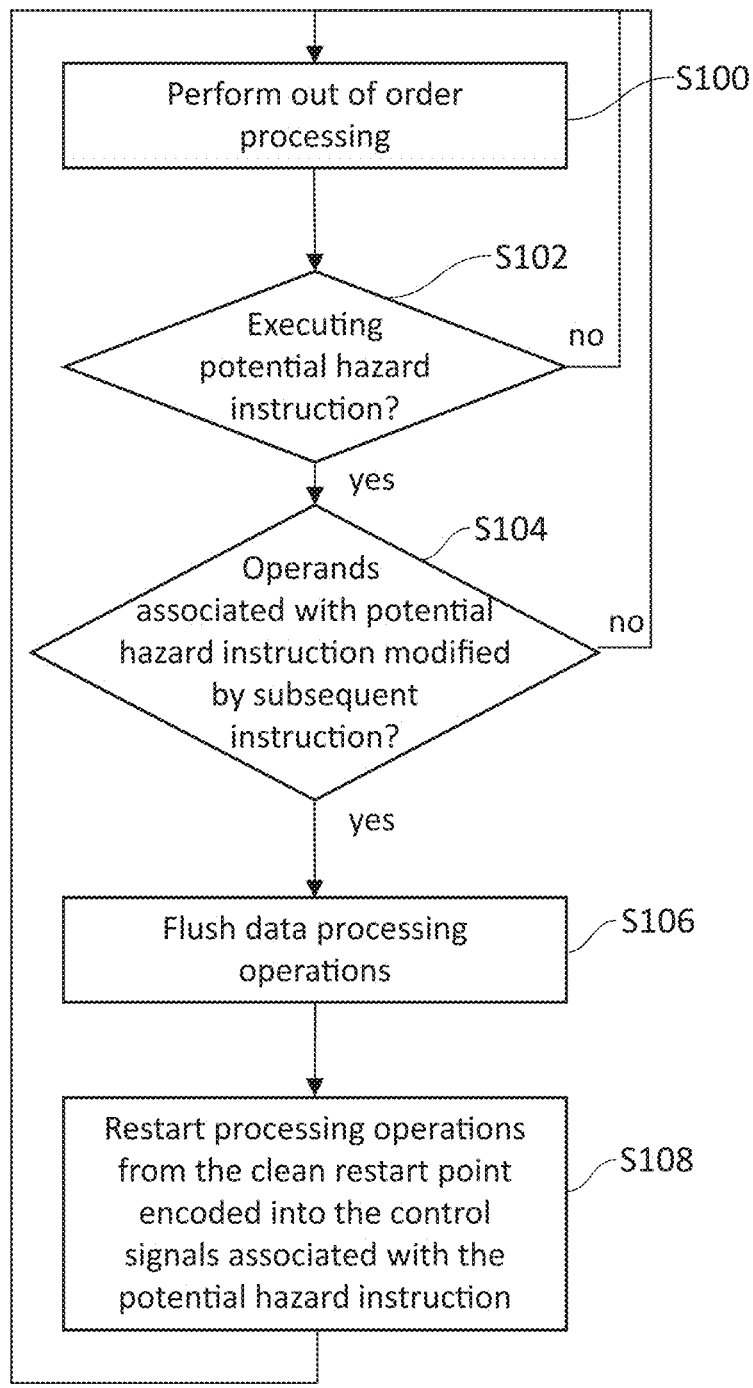
FIG. 7 schematically illustrates a sequence of steps carried out by decode circuitry according to various configurations of the present disclosure.

FIG. 7 schematically illustrates a sequence of steps carried out by processing circuitry according to various configurations of the present disclosure. Flow begins at step S100 where out-of-order processing is performed. Flow then proceeds to step S102 where it is determined whether a potential hazard instruction is being executed. If no then flow returns to step 5100. If however, at step 5102, it was determined that a potential hazard instruction was being executed then flow proceeds to step S104 where the data processing circuitry determines whether any of the operands that are associated with the potential hazard instruction have been modified by a subsequent instruction. If no then flow returns to step S100. If however, at step 5104 it was determined that operands associated with the potential hazard instruction have been modified by a subsequent instruction then flow proceeds to step 5106 where held data values that are associated with instructions subsequent to a clean restart point, as identified in the control signals associated with the potential hazard instruction, are flushed from the data processing circuitry. Flow then proceeds to step 5108 where the data processing circuitry restarts processing operations from the clean restart point that is encoded into the control signals associated with the potential hazard instruction. Flow then returns to step S100.

Figure 8:
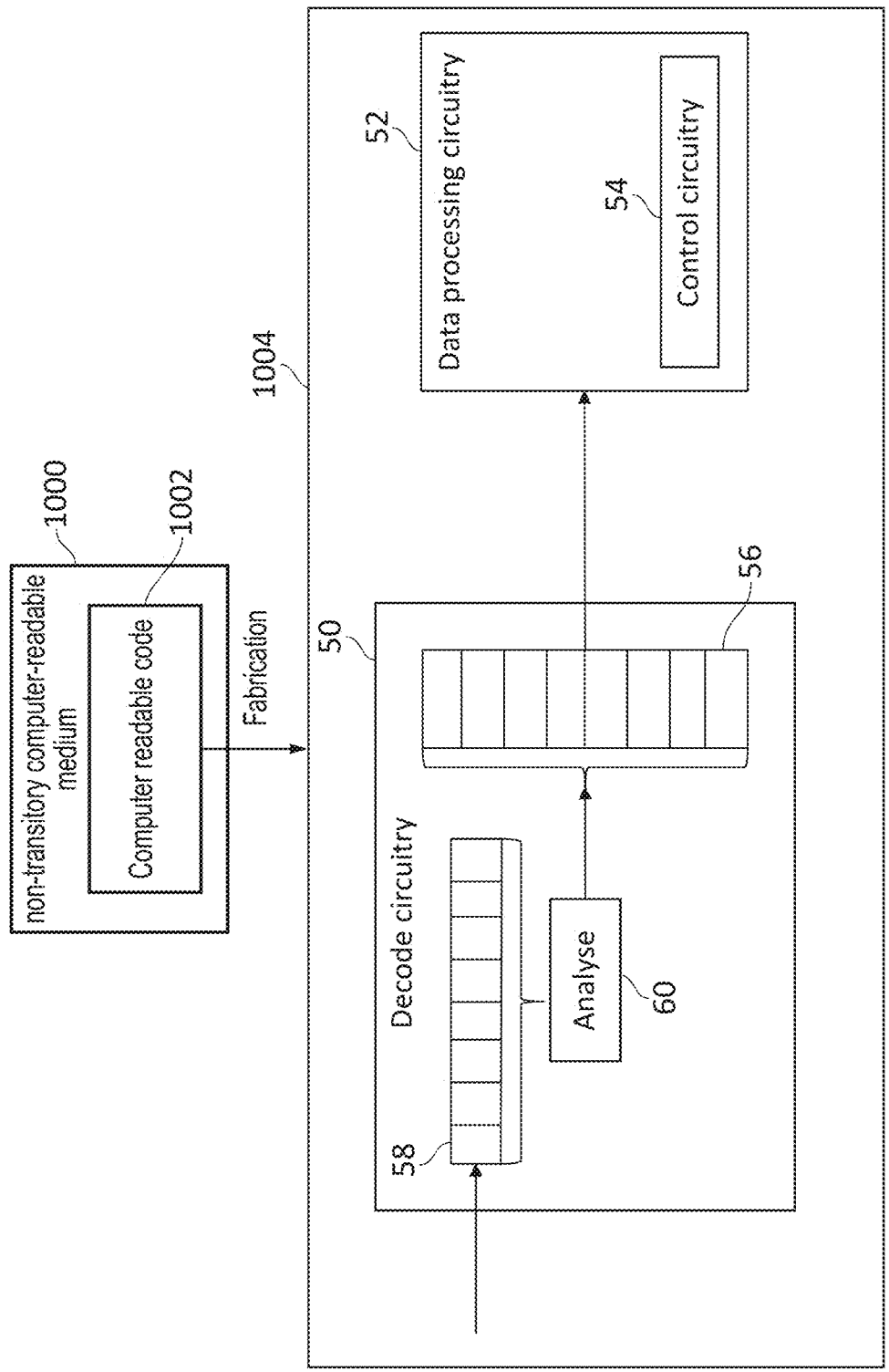
FIG. 8 schematically illustrates a non-transitory computer-readable medium comprising computer readable code for fabrication of a data processing apparatus according to various configurations of the present disclosure.

FIG. 8 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 comprises decode circuitry 58 comprising analysis circuitry, the decode circuitry configured to receive a block of instructions 58 and to generate control signals 56 encoding information indicative of a clean restart point. The fabricated design further comprises data processing circuitry 52 which in turn, comprises control circuitry 54 as described in reference to FIG. 2.

In brief overall summary there is provided a data processing apparatus comprising decode circuitry responsive to receipt of a block of instructions to generate control signals indicative of each of the block of instructions, and to analyse the block of instructions to detect a potential hazard instruction. The data processing apparatus is provided with decode circuitry to encode information indicative of a clean restart point into the control signals associated with the potential hazard instruction. The data processing apparatus is provided with data processing circuity to perform out-of-order execution of at least some of the block of instructions, and control circuitry responsive to a determination, at execution of the potential hazard instruction, that data values used as operands for the potential hazard instruction have been modified by out-of-order execution of a subsequent instruction, to restart execution from the clean restart point and to flush held data values from the data processing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Configurations of the present techniques are also described by the following numbered clauses:

Clause 1. A data processing apparatus comprising:
decode circuitry responsive to receipt of a block of instructions having a program counter order to generate control signals indicative of each of the block of instructions, and to analyse the block of instructions to detect a potential hazard instruction, wherein the decode circuitry is configured to encode information indicative of a clean restart point into the control signals associated with the potential hazard instruction;
data processing circuity to perform data processing operations in response to the control signals, wherein the data processing circuitry is configured to perform out-of-order execution of at least some of the block of instructions; and control circuitry responsive to a determination, at a point of execution of the potential hazard instruction, that data values to be used as operands associated with the potential hazard instruction have been modified by out-of-order execution of a subsequent instruction that occurs sequentially after the potential hazard instruction in the program counter order, to restart execution from the clean restart point and to flush held data values associated with instructions subsequent to the clean restart point from the data processing circuitry.

Clause 2. The data processing apparatus of claim 1, wherein the clean restart point identifies a restart instruction that occurs after the potential hazard instruction in the program counter order.

Clause 3. The data processing apparatus of clause 2, wherein the restart instruction is one of the block of instructions.

Clause 4. The data processing apparatus of clause 2 or clause 3, wherein the restart instruction is separated from the potential hazard instruction by at least one other instruction in the program counter order.

Clause 5. The data processing apparatus of any of clauses 2 to 4, wherein the restart instruction occurs before the subsequent instruction in the program counter order.

Clause 6. The data processing apparatus of any of clauses 2 to 5, wherein:
the subsequent instruction is a sequentially first load instruction to occur after the potential hazard instruction in the program counter order; and
the restart instruction is a youngest instruction to occur before the sequentially first load instruction in the program counter order.

Clause 7. The data processing apparatus of clause 5, wherein the restart instruction is a sequentially first branch instruction to occur after the potential hazard instruction in the program counter order.

Clause 8, The data processing apparatus of clause 7, further comprising branch prediction circuitry, and wherein the control circuitry is configured to postpone flushing the data processing circuitry until resolution of the sequentially first branch instruction by the branch prediction circuitry.

Clause 9. The data processing apparatus of clause 8, wherein:
the branch prediction circuitry comprises a mis-prediction flushing mechanism to flush held data values associated with instructions subsequent to a mis-predicted branch instruction; and
the control circuitry is configured to restart execution from the clean restart point and to flush held data values associated with instructions subsequent to the clean restart point from the data processing circuitry by triggering the mis-prediction flushing mechanism.

Clause 10. The data processing apparatus of clause 5, wherein the data processing circuitry is responsive to the control signals to perform one or more micro- operations for each of the block of instructions, and the restart instruction is a sequentially first instruction of the block of instructions to occur after the potential hazard instruction in the program counter order for which a plurality of micro-operations is performed.

Clause 11. The data processing apparatus of any preceding clause, wherein the potential hazard instruction is a store instruction.

Clause 12. The data processing apparatus of any preceding clause, wherein the subsequent instruction is a load instruction.

Clause 13. The data processing apparatus of any preceding clause, wherein the information indicative of the clean restart point comprises information identifying a number of micro-operations between the potential hazard instruction and the clean restart point.

Clause 14. The data processing apparatus of any preceding clause, wherein the information indicative of the clean restart point comprises information identifying a number of program counter values between the potential hazard instruction and the clean restart point.

Clause 15. The data processing apparatus of any preceding clause, wherein the subsequent instruction is an instruction of a subsequent block of instructions.

Clause 16. The data processing apparatus of any preceding clause, further comprising storage circuitry to store the information indicative of the clean restart point in association with information identifying the potential hazard instruction.

Clause 17. The data processing apparatus of clause 16, wherein the storage structure is a micro-operation cache and the information identifying the potential hazard instruction is the control signals associated with the potential hazard instruction stored as one or more micro-operations.

Clause 18. The data processing apparatus of clause 17, wherein the decode circuitry is configured to store the information indicative of the clean restart point by appending the information indicative of the clean restart point to at least one of the one or more micro-operations.

Clause 19. A method of operating a data processing apparatus comprising
receiving a block of instructions having a program counter order, generating control signals indicative of each of the block of instructions, analysing the block of instructions to detect a potential hazard instruction, and encoding information indicative of a clean restart point into the control signals associated with the potential hazard instruction;
performing, with data processing circuitry, data processing operations in response to the control signals, wherein performing the data processing operations includes performing out-of-order execution of at least some of the block of instructions; and
responsive to a determination, at a point of execution of the potential hazard instruction, that data values to be used as operands associated with the potential hazard instruction have been modified by out-of-order execution of a subsequent instruction that occurs sequentially after the potential hazard instruction, restarting execution from the clean restart point and flushing held data values associated with instructions subsequent to the clean restart point from the data processing circuitry.

Clause 20. A non-transitory computer-readable medium to store computer-readable code for fabrication of a data processing apparatus comprising:
decode circuitry responsive to receipt of a block of instructions having a program counter order to generate control signals indicative of each of the block of instructions, and to analyse the block of instructions to detect a potential hazard instruction, wherein the decode circuitry is configured to encode information indicative of a clean restart point into the control signals associated with the potential hazard instruction;
data processing circuity to perform data processing operations in response to the control signals, wherein the data processing circuitry is configured to perform out-of-order execution of at least some of the block of instructions; and
control circuitry responsive to a determination, at a point of execution of the potential hazard instruction, that data values to he used as operands associated with the potential hazard instruction have been modified by out-of-order execution of a subsequent instruction that occurs sequentially after the potential hazard instruction, to restart execution from the clean restart point and to flush held data values associated with instructions subsequent to the clean restart point from the data processing circuitry.

We claim:

1. A data processing apparatus comprising:
   decode circuitry responsive to receipt of a block of instructions having a program counter order to generate control signals indicative of each of the block of instructions, and to analyse the block of instructions to detect a potential hazard instruction in the block of instructions, wherein the decode circuitry is configured to encode information indicative of a clean restart point into particular ones of the control signals that are associated with the potential hazard instruction;
   data processing circuity to perform data processing operations in response to the control signals, wherein the data processing circuitry is configured to perform out-of-order execution of at least some of the block of instructions; and
   control circuitry responsive to a determination, at a point of execution of the potential hazard instruction, that data values to be used as operands associated with the potential hazard instruction have been modified by out-of-order execution of a subsequent instruction that occurs sequentially after the potential hazard instruction in the program counter order, to restart execution from the clean restart point and to flush held data values associated with instructions subsequent to the clean restart point from the data processing circuitry,
   wherein the clean restart point identifies a restart instruction that occurs after the potential hazard instruction in the program counter order.

2. The data processing apparatus of claim 1, wherein the restart instruction is one instruction of the block of instructions.

3. The data processing apparatus of claim 1, wherein the restart instruction is separated from the potential hazard instruction by at least one other instruction in the program counter order.

4. The data processing apparatus of claim 1, wherein the restart instruction occurs before the subsequent instruction in the program counter order.

5. The data processing apparatus of claim 4, wherein the restart instruction is a sequentially first branch instruction to occur after the potential hazard instruction in the program counter order.

6. The data processing apparatus of claim 5, further comprising branch prediction circuitry, and wherein the control circuitry is configured to postpone flushing the data processing circuitry until resolution of the sequentially first branch instruction by the branch prediction circuitry.

7. The data processing apparatus of claim 6, wherein:
   the branch prediction circuitry comprises a mis-prediction flushing mechanism to flush held data values associated with instructions subsequent to a mis-predicted branch instruction; and
   the control circuitry is configured to restart execution from the clean restart point and to flush held data values associated with instructions subsequent to the clean restart point from the data processing circuitry by triggering the mis-prediction flushing mechanism.

8. The data processing apparatus of claim 4, wherein the data processing circuitry is responsive to the control signals to perform one or more micro-operations for each of the block of instructions, and the restart instruction is a sequentially first instruction of the block of instructions to occur after the potential hazard instruction in the program counter order for which a plurality of micro-operations is performed.

9. The data processing apparatus of claim 1, wherein:
   the subsequent instruction is a sequentially first load instruction to occur after the potential hazard instruction in the program counter order; and
   the restart instruction is a youngest instruction to occur before the sequentially first load instruction in the program counter order.

10. The data processing apparatus of claim 1, wherein the potential hazard instruction is a store instruction.

11. The data processing apparatus of claim 1, wherein the subsequent instruction is a load instruction.

12. The data processing apparatus of claim 1, wherein the information indicative of the clean restart point comprises information identifying a number of micro-operations between the potential hazard instruction and the clean restart point.

13. The data processing apparatus of claim 1, wherein the information indicative of the clean restart point comprises information identifying a number of program counter values between the potential hazard instruction and the clean restart point.

14. The data processing apparatus of claim 1, wherein the subsequent instruction is an instruction of a subsequent block of instructions.

15. The data processing apparatus of claim 1, further comprising storage circuitry to store the information indicative of the clean restart point in association with information identifying the potential hazard instruction.

16. The data processing apparatus of claim 15, wherein the storage circuitry is a micro-operation cache and the information identifying the potential hazard instruction is the particular ones of the control signals that are associated with the potential hazard instruction stored as one or more micro-operations.

17. The data processing apparatus of claim 16, wherein the decode circuitry is configured to store the information indicative of the clean restart point by appending the information indicative of the clean restart point to at least one of the one or more micro-operations.

18. A method of operating a data processing apparatus comprising
   receiving a block of instructions having a program counter order, generating control signals indicative of each of the block of instructions, analysing the block of instructions to detect a potential hazard instruction in the block of instructions, and encoding information indicative of a clean restart point into particular ones of the control signals that are associated with the potential hazard instruction;
   performing, with data processing circuitry, data processing operations in response to the control signals, wherein performing the data processing operations includes performing out-of-order execution of at least some of the block of instructions; and
   responsive to a determination, at a point of execution of the potential hazard instruction, that data values to be used as operands associated with the potential hazard instruction have been modified by out-of-order execution of a subsequent instruction that occurs sequentially after the potential hazard instruction, restarting execution from the clean restart point and flushing held data values associated with instructions subsequent to the clean restart point from the data processing circuitry, wherein the clean restart point identifies a restart instruction that occurs after the potential hazard instruction in the program counter order.

19. A non-transitory computer-readable medium to store computer-readable code for fabrication of a data processing apparatus comprising:

decode circuitry responsive to receipt of a block of instructions having a program counter order to generate control signals indicative of each of the block of instructions, and to analyse the block of instructions to detect a potential hazard instruction in the block of instructions, wherein the decode circuitry is configured to encode information indicative of a clean restart point into particular ones of the control signals that are associated with the potential hazard instruction;

data processing circuity to perform data processing operations in response to the control signals, wherein the data processing circuitry is configured to perform out-of-order execution of at least some of the block of instructions; and control circuitry responsive to a determination, at a point of execution of the potential hazard instruction, that data values to be used as operands associated with the potential hazard instruction have been modified by out-of-order execution of a subsequent instruction that occurs sequentially after the potential hazard instruction, to restart execution from the clean restart point and to flush held data values associated with instructions subsequent to the clean restart point from the data processing circuitry, wherein the clean restart point identifies a restart instruction that occurs after the potential hazard instruction in the program counter order.

* * * * *